United States Patent Office 3,546,153
Patented Dec. 8, 1970

3,546,153
STABILIZED ALKALI SOLUBLE RESINS
Herbert J. Mellan, Buffalo, and Joseph A. Pawlak, Town of Cheektowaga, N.Y., assignors to Hooker Chemical Corporation, Niagara Falls, N.Y., a corporation of New York
No Drawing. Continuation-in-part of applications Ser. No. 357,820, Apr. 6, 1964, and Ser. No. 652,678, July 12, 1967. This application July 9, 1968, Ser. No. 743,321
Int. Cl. C08g 51/24
U.S. Cl. 260—29.3
8 Claims

ABSTRACT OF THE DISCLOSURE

A discoloration resistant thermoplastic alkali soluble resin selected from the group consisting of (a) an esterified hydroxyalkylated phenol-aldehyde novolac containing less than about 0.5 percent of the phenolic hydroxyls unreacted, (b) polyester resin having chemically combined terpene therein, (c) shellac, and (d) mixtures thereof, containing as a discoloration inhibitor between about 0.5 percent and about 4.5 percent by weight of a sulfur-containing compound selected from the group consisting of a compound of the formula RSH wherein R is selected from the group consisting of alkyl, aryl and alkylaryl and an alkali metal salt wherein the anion is selected from the group consisting of sulfite, bisulfite and hydrosulfite.

---

This is a continuation-in-part of Ser. No. 357,820, filed Apr. 6, 1964, now abandoned, and Ser. No. 652,678, filed July 12, 1967, now abandoned.

This invention relates to alkali soluble resins and more particularly to stabilized alkali soluble resins, their solutions and process of preparation.

Alkali soluble resins are useful in emulsion polishes wherein they serve to improve the gloss and hardness of the polish and function as binders and for other purposes. In addition to conferring the foregoing properties alkali soluble resins should not discolor the emulsion polish, either when initially formulated or after prolonged standing.

There have now been found certain sulfur-containing compounds which effectively inhibit the color formation normally associated with ammonia soluble resins and yet do not adversely affect the useful properties of the alkali soluble resins.

In accordance with this invention there is provided a discoloration resistant thermoplastic alkali soluble resin containing, as an inhibitor of discoloration, a sulfur-containing compound selected from the group consisting of a compound of the formula RSH wherein R is alkyl, aryl or alkylaryl and an alkali metal salt in which the anion is selected from the group consisting of sulfite, bisulfite and hydrosulfite.

The color inhibitor of this invention is preferably added to the resin in an amount from about 0.5 to about 4.5 percent although satisfactory color inhibition may be obtained by using the inhibitors in an amount from 0.1 to about 6.0 percent by weight of the resin. Little advantage is obtained by the employment of larger quantities, although color inhibiting amounts greater than 6 percent may be employed if so desired. These color inhibitors may be added to the resin at a sutiable time, which is usually either during the final steps of resin manufacture or when the resin is solubilized in alkali solution.

Compounds of the formula RSH wherein R is alkyl, aryl or alkylaryl are well suited to this invention. Preferably the R substituent will contain from 2 to 10 carbon atoms when alkyl and from 6 to 10 carbon atoms when aryl or alkylaryl. Illustrative of these stabilizers are amyl mercaptan, octyl mercaptan, decyl mercaptan, thiophenol and benzyl mercaptan.

Alkali metal salts in which the anion is sulfite, bisulfite or hydrosulfite are also well suited to this invention. Particularly desirable results are obtained when the alkali metal is potassium or sodium. Among the most useful salts employed in this invention are sodium sulfite, sodium bisulfite and sodium hydrosulfite.

The thermoplastic alkali soluble resin of this invention is preferably selected from the group consisting of (a) esterified oxyalkylated phenol-aldehyde novolac having less than 0.5 percent of the phenolic hydroxyls unreacted, (b) polyester resins having chemically combined terpenes therein, (c) shellac, and (d) mixtures thereof. These resins are acidic, thermoplastic and soluble in ammonia solutions and volatile amines, but insoluble in water. These resins are also soluble in stronger alkali solutions, such as sodium hydroxide; however, these stronger alkali materials are not normally used for they tend to solubilize floor polishes. Under some circumstances relatively minor amounts of these stronger alkalies may also be used, however. Shellac is a naturally occurring acidic resin derived from stick lac by grinding the stick lac, separating the foreign matter and thereafter bleaching.

While there are thermoplastic polyurethane materials which can be "hydrolyzed" under conditions which are catalyzed by alkali, it is to be understood these polymethanes and the hydrolysis reaction are not to be included within the scope of the "solubilization" of an acidic organic material by neutralization with the basic reagent used herein.

Novolacs are thermoplastic condensation products of phenol and aldehyde condensed with an acid catalyst such as oxalic or sulfuric acids. Phenols which may be used in preparing phenol-aldehyde condensates for use in practicing the invention include phenol itself and substituted phenols having the following general formula:

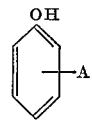

where A may be H or a suitable substituent selected from the following:
 (a) Alkyl groups or radicals of 1 to 18 carbon atoms in their various isomeric forms and substituted on the phenolic nucleus in the ortho-, meta, or para-positions;
 (b) Alicyclic groups of 5 to 18 carbon atoms such as cyclohexyl, cyclopentyl, methyl cyclohexyl, butyl-cyclohexyl, etc.;
 (c) Alkyl and alicyclic ketonic groups wherein the hydrocarbon portion is as defined above in (a) and (b);
 (d) Alkyl and alicyclic carboxylic groups wherein the hydrocarbon part is defined above in (a) and (b); and
 (e) Aryl-substituted alkyl wherein the alkyl group has 1 to 18 carbon atoms and the aryl is phenyl or naphthyl which may contain lower alkyl and/or hydroxy substituents, so that the resulting phenol is, for example, a bisphenol.

Suitable substituted phenols include the following from (a): para-tertiary-butylphenol, para-secondary-butylphenol, para-tertiary-amylphenol, para-tertiary-hexylphenol, para-iosoctylphenol, para-tertiary-octyl-phenol, para-tertiary-nonylphenol, para-cumylphenol, para-decylphenol, para-dodecyl-phenol, para-tetra-decyl-phenol, para-octa-decyl-phenol, para-nonyl-phenol, para-methyl-phenol, para-pentadecyl-phenol, para-cetyl-phenol; from (b): para-cyclohexylphenol, a phenol alkylated with a terpene, such as limonene in any of its isometric d-, l-, or dl- forms, a phenol alkylated with pinenes, such as α and β-pinene; from (c):para-hydroxy acetophenone, para-hydroxy benzophenone; from (d):a phenol alkylated with oleic acid; from (e):para-phenylphenol, para-benzylphenol, para-beta-naphthyl-phenol, para-alpha-naphthylphenol, bisphenols, such as para,para'-isopropylidenediphenol, para,para'-methylenediphenol and a phenol alkylated with styrene, as well as the corresponding ortho and meta derivatives of the previously mentioned compounds such as meta-butyl phenol and orthobutyl phenol as well as mixtures thereof. Not included within the scope of this invention are the alkenyl phenolic compounds of the kind described or referred to in Canadian Pat. 569,278, either alone or in combination with other phenols, for these have substantial amounts of unreacted phenolic hydroxyls capable of forming colored substances.

From the foregoing, it is apparent that many phenols may be used in practicing the present invention provided the phenol employed has a reactive phenolic hydroxyl group and is capable of reacting with aldehydes, such as formaldehyde, to produce a condensate. The pure refined phenols may be used, but this is not always necessary. For instance, phenols may be alkylated and then may be reacted with an aldehyde as the crude product which may contain some polyalkylated, as well as alkylated phenols. Mixtures of various phenols mentioned herein also may be used.

In producing the parent phenol-aldehyde condensates, suitable aldehydes or mixtures of aldehydes capable of reacting with a phenol and having not more than, for example, eight carbon atoms, are satisfactory provided they do not determintally affect the resinfication, esterification of oxyalkylation of the resin. The preferred aldehydes are aldehydes having 1 to 4 carbon atoms such as formaldehyde, which may be in aqueous solution or in any of its low polymeric forms such as paraform or trioxane, and isobutyraldehyde. Other examples of aldehydes include paraldehyde, furfural, 2-ethyl-hexanal, ethylbutyraldehyde, heptaldehyde and glyoxal.

Novolacs are deficient in methylene producing groups and are incapable of advancing to the permanently cross-linked, insoluble, infusible stage by the application of heat alone. Resoles, which are alkaline catalized phenol-aldehyde condensation products, are water soluble but ammonia insoluble and are outside the scope of this invention. A typical novolac is prepared by heating phenol and an acid catalyst to about 100 degrees centigrade and slowly adding the aldehyde with stirring to the phenol. After all the aldehyde has reacted, the catalyst is neutralized. The resin is then dehydrated, cooled, solidified and ground to desired size.

The phenol-aldehyde novolac is reacted with a suitable substance designed to etherify the phenolic hydroxyl groups. Substantially all of the phenolic hydroxyl groups present in each phenol-aldehyde condensate unit are reacted with a substance or substances which are in turn reacted with a polycarboxylic compound. The modified novolac preferably contains substantially no free reactive phenolic groups (i.e., less than about 0.5 percent of the phenolic hydroxyl, for example) present originally in the phenol-aldehyde condensate. This is desirable to prevent oxidation and undesirable darkening in the resultant product. Thus, at least one mole of alkylene oxide or other etherifying or esterifying agent is required per mole of phenolic hydroxyl.

It is preferred to first hydroxyalkylate the phenolic hydroxyl groups, and then to esterify the resultant groups with a carboxylic acid, acid chloride or acid anhydride. The preferred method of hydroxyalkylation is by reaction with compounds containing a mono-oxirane ring. Such compounds include ethylene, propylene, butylene, styrene and cyclohexene oxides, glycide and epichorohydrin. Many other monoepoxides can be used, but the alkylene oxides containing not more than six carbons are generally used. Additional useful compounds are phenyl glycidyl ether and related compounds prepared from the reaction of epichlorohydrin and monofunctional alkylated and halogenated phenols such as pentachlorophenyl glycidyl ether.

At least one mole of alkylene oxide or other etherifying or esterifying agent is required per mole of phenolic hydroxyl. However, resins prepared by reaction with up to three moles of alkylene oxide per mole of phenolic hydroxyl are useful. It is required that there be at least one hydroxyalkyl group per condensate molecule.

Catalysts for the reaction of the oxirane ring compounds and phenolic hydroxyl groups are alkali or alkaline earth hydroxides, primary amines, secondary amines, tertiary amines or basic alkali salts. These include sodium, potassium, lithium, calcium and barium hydroxides, amines such as methyl, dimethyl, diethyl, trimethyl, triethyl, tripropyl, dimethyl benzyl, dimethyl hydroxyethyl, dimethyl-2-hydroxypropyl and the like, and salts of strong bases and weak acids such as sodium acetate or benzoate. The reaction may be carried out at temperatures of fifty to two hundred and fifty degrees centigrade, and preferably in the absence of solvents, although solvents may be used to reduce viscosity.

The phenolic hydroxyl of the novolacs may also be hydroxyalkylated by reacting alkylene halohydrins with the phenolic hydroxyl using equivalent amounts of an alkali metal hydroxide to bring about the reaction. Suitable alkylene halohydrins are ethylene chloro- or bromohydrins, propylene chloro- or bromohydrins, 2,3-butylene chloro- or bromohydrins, glyceryl chloro- or bromohydrins.

Another method for hydroxyalkylating novolacs is reaction with alkylene carbonates such as ethylene carbonate, and propylene carbonate, using a catalyst such as potassium carbonate.

A variety of acids acid halides, acid anhydrides, etc., or mixtures thereof may be used for reaction with the hydroxyalkyl phenyl-ethers of novolacs such as prepared in accordance with the invention. For example, the hydroxy-alkyl novolacs may be esterified with 0.5 to 1.0 mole of an alpha, beta-unsaturated dicarboxylic acid anhydride per hydroxyl equivalent. The carboxylic acids and the corresponding acid chlorides and acid anhydrides include phthalic, hexahydrophthalic, tetrahydrophthalic, tetrachlorophthalic, methylnadic, and chlorendic. These carboxylic compounds are the preferred carboxylic compounds for use in the invention because their use in the compositions maintains the melting point of the ammonia-soluble resin above sixty degrees centigrade. The preferred range of melting point is sixty to one hundred and forty degrees centigrade. Less preferred carboxylic compounds that can be used in the compositions of the invention are the acids, acid chlorides and anhydrides such as maleic, chloromaleic, ethylmaleic, itaconic, citraconic, mesaconic, succinic and trimellitic. The acid bromides and acid iodides corresponding to the aforementioned acid chlorides are also suitable, but are more costly to use.

The esterification of the hydroxyether derivative is preferably carried out at a temperature in the range of about one hundred to one hundred and fifty degrees centigrade, although higher and lower temperatures can be used. When polycarboxylic acids are used, the progress of the esterification reaction can be monitored by measuring the quantity of water of esterification that is produced. Small quantities of toluene or xylene can be used as azeotroping agents to facilitate removal of the water. When acid chlorides are used, it is preferred to use solvents during the reaction. The acid chloride can be dissolved in a suitable solvent such as benzene and methylene dichloride and added to the hydroxyether derivative also dissolved in the same or a similar solvent. The reaction can be conducted at a temperature up to the boiling point of the solvent. The solvent can be readily removed such as by stripping at the completion of the reaction. The progress of the reaction involving the acid chlorides can be monitored by measuring the quantity of hydrogen chloride evolved during the course of the esterification. Moreover, in the reactions involving the acid chlorides, it is advantageous to use a hydrogen halide acceptor such as amines and strong bases. Preferred acceptors are tertiary amines such as pyridine, and triethylamine. The remaining acid chloride group from the dibasic acid chlorides is hydrolyzed to the acid.

Esterified hydroxyalkylated phenol aldehyde novolacs of the type stabilized herein are described in U.S. 3,373,127.

Polyesters having chemically combined terpene are also enhanced by the stabilizers of this invention. These polyesters are a Diels-Alder adduct of terpene (i.e., rosin) connected by ester linkages to a low molecular weight polyol polyester residue. These resins may be prepared by reacting rosin with an $\alpha,\beta$-unsaturated dicarboxylic compound to form the desired adduct and esterifying the adduct with a low molecular weight polyol polyester.

The term rosin as employed herein is understood to embrace gum, wood and tall oil rosins. Rosin is generally recognized as having approximately the same ratio of rosin acids to unsaponifiable materials, whether derived from wood stumps or from the sap of the pine tree. The major acid components of rosin are abietic acid and abietic-type acids which contain conjugated unsaturation.

Briefly these resins may be generalized as linear resins of the type illustrated by the formula:

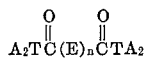

where T is the nucleus of the rosin adduct, E is the polyol polyester, A is COOH and COOR, $n$ is from 1 to 10, and R is a saturated fatty alkyl of 8 to 20 carbon atoms. It is to be appreciated that a random A may be a site of cross-linking instead of COOH and that E may be an aliphatic hydroxyl compound instead of a polyol polyester. Polyesters having chemically combined terpene of the type stabilized herein are described in Ser. No. 284,826, filed June 30, 1963, now abandoned and refiled as a continuation-in-part application Ser. No. 597,218, filed Nov. 28, 1966, now U.S. 3,450,657.

The color stabilizer can be added to the ground resin and dry blended until a uniform distribution has been obtained. The stabilizer can also be added to the resin while the resin is in a molten state. The stabilizer of course, can also be added to alkaline solutions of the resin.

The resins employed in this invention are solubilized by charging the resin to an alkaline solution and stirring. Complete solubilization may be more quickly achieved by gently heating the alkaline solution. Various ratios of resin to water such as 8:100 to 30:100 can be employed to achieve desirable alkaline solutions. Alkalinity indicated by a pH of 7.5 to 11.0 is desirable. Beneficial resin solutions are obtained when 100 parts (by weight) of resin are dissolved in 500 parts of an ammoniacal solution comprised of 482 parts of water and 18 parts of 28 percent ammonium hydroxide. In addition to ammonium hydroxide these resins are solubilized by the use of amine bases, such as morpholine, diethylethanolamine, 2-amino-2-methyl-1-propanol and triethanolamine. It is to be understood that resins soluble in the above and similar amines are also contemplated and embraced within the expression "ammonia-soluble" resins. In addition to the above amines and ammonium hydroxide, which are added directly to the water, the resins may be solubilized by the use of other alkaline materials, such as sodium borate, caustic soda and caustic potash.

The invention is illustrated by the following examples, in which parts are given by weight and temperatures are in degrees centigrade.

EXAMPLE 1

An ammonia soluble resin was prepared by charging into a ten gallon glass-lined reactor 7,050 parts of phenol, thirty-five parts of oxalic acid and fourteen parts of an anionic wetting agent. The phenol was heated to ninety to one hundred degrees centigrade, and the 4,040 parts of a thirty-seven percent formaldehyde solution were added over a period of about one hour. The resin was refluxed until free of formaldehyde and then water and unreacted phenol were removed by distillation, which was completed at two hundred degrees centigrade under vacuum. There was produced 6,500 parts of a phenol-aldehyde resin having an average molecular weight of about five hundred and twenty. The resin produced (5,200 parts) was charged to a five-gallon reactor and heated to one hundred and twenty to one hundred and thirty degrees centigrade, after which 5.2 parts of sulfuric acid were added to the vessel. Limonene (4,080 parts) was added to the mixture and the temperature was raised to one hundred and sixty degrees centigrade. After two hours a vacuum was applied to the reactor and 365 parts of unreacted limonene were removed, indicating that 0.55 mole of limonene had reacted per mole of phenol. The hydroxyl number of the finished resin was two hundred and seventy.

The resin produced (5,200 parts) was added to a glass-lined, pressure reactor and heated to about one hundred and fifty degrees centigrade. Eighty-six grams of trimethylamine were pumped into the reactor, followed by 8,680 parts of propylene oxide at a rate to maintain the temperature at one hundred and fifty to one hundred and seventy degrees centigrade and the pressure below eighty p.s.i. After three hours the pressure had dropped to fifty p.s.i., and the pressure was released and excess propylene oxide was removed by distillation which was completed under vacuum. The hydroxy propylated resin had a phenolic-hydroxyl content of 0.12 percent and a hydroxyl number of 164.

The resin produced (4,860 parts) was charged into a five-gallon, glass-lined reactor and heated to a temperature of one hundred and twenty to one hundred and thirty degrees centigrade. Phthalic anhydride (4,380 parts) was added to the reactor. After about one hour, the resulting resin had an acid number of one hundred and thirty-two and a melting range of 78–87 degrees. The resin was insoluble in water and a sixteen percent resin solid water mixture had a pH of about 4. Thereafter, sodium sulfite (3.5 percent of resin by weight) was added to the hot viscous resin. The resin was agitated until the sodium sulfite was well dispersed and then the resin was discharged into cooling trays.

The resin (100 parts) was dissolved in a solution of eighteen parts of 28 percent aqueous ammonium hydroxide and five hundred and forty-eight parts of water. The ammoniacal solution had a Gardner color number of 2 and after one hundred and thirty-six hours exposure to an RS sunlamp the color number was less than 3. RS is a term commonly used to identify an electric light source having both tungsten and mercury light sources, reflector type bulb and consuming about 275 watts of electrical energy.

A second esterified, hydroxyalkylated phenol aldehyde resin was prepared with the same reactants and processed as above except the resin contained no color inhibitor. The resin was also solubilized in the same manner in an ammoniacal solution. This solution had a Gardner color number of 2 but after 136 hours of exposure the color number became greater than 6.

EXAMPLE 2

An additional amount of the unstabilized resin of Example 1 was solubilized by dissolving 8 parts of resin in 42 parts of water containing 18 parts of 28 percent aqueous ammonium hydroxide for each 548 parts of water. To portions of this solution various color inhibitors were added and the products were tested with the results shown in Table I below.

TABLE I

| Inhibitor | Stabilizer, percent of resin | Gardner Color Number | | |
|---|---|---|---|---|
| | | Original | Exposure-R.S. Sun Lamp 64 hours | 88 hours |
| Benzyl mercaptan | 3.5 | 1+ | | 2+ |
| Thiophenol | 3.5 | 1+ | | 2 |
| Amyl mercaptan | 3.5 | 1+ | 2+ | |
| Octyl mercaptan | 3.5 | 1+ | 2+ | |
| Decyl mercaptan | 3.5 | 1+ | 3+ | |
| None | | 1+ | 4-5 | 5 |

EXAMPLE 3

Additional ammonical solutions of the resin of Example 1 were treated with various sodium salts and were aged for 30 days at 52 degrees. The results are tabulated in Table II below.

TABLE II

| Inhibitor | Stabilizer, percent of resin | Gardner Color Number | |
|---|---|---|---|
| | | Original | Aged 30 days at 52° |
| Sodium sulfite | 3.0 | 2 | 3 |
| Sodium bisulfite | 3.0 | 2 | 3 |
| Sodium hydrosulfite | 3.0 | 2 | ¹1 |
| None | | 2 | 17 |

¹ Cloudy.

EXAMPLE 4

A terpene based polyester resin was formed in the following manner: a two liter three-necked flask equipped with stirrer, vertical steam heater condenser, trap, and vertical water-cooled condenser, was charged with 120 parts of propylene glycol. The glycol was heated to 120 degrees centigrade using an electrical heating mantle and 166 parts of isophthalic acid was added. The mixture was then rapidly heated to 195-200 degrees centigrade and held at this temperature thereby effecting esterification while removing the water of condensation and some glycol until the charge became clear and an acid number of 75±15 was obtained. When the theoretical amount of water had been added, the temperature was reduced to about 130 degrees and the weight of the propylene glycol lost from the reaction at the higher temperature was returned to the flask. To this polyol polyester, 360 parts of rosin and 113 parts of fumaric acid were added. The mixture was heated rapidly to 230 degrees and reacted at that temperature until an acid number of 150 and a melt point of about 115 degrees centigrade were reached. (Reaction time was approximately two hours.) The resin was then dumped from the vessel and chilled rapidly. Final test on the brittle resin indicate the following: Acid number: 156; melt point: 113 degrees centigrade; Gardner color: 10. An ammonia solution of the resin (16% solids, 12 cubic centimeters of 28% ammonia per 50 grams resin) resulted in a resin solution having the following properties: Gardner Holt viscosity: $A_3$; Gardner color: 7 pH of 7.9; appearance: clear. To this was added 3% (based on 100 parts of resin) sodium hydrosulfite. The resulting Gardner color was 6. After one month exposure in an oven at 52 degrees centigrade the Gardner color was still 6, whereas without the stabilizer, the Gardner color was 12.

In a similar manner, a resin of the present invention is produced by reacting the polyol polyester with the reaction product of the Diels-Alder adduct of rosin and fumaric acid to thereby obtain a correspondingly good result.

EXAMPLE 5

Other resins were inhibited with sodium sulfite according to this invention and were aged 30 days at 52 degrees centigrade in this example and the results are tabulated in Table III.

Resin A

A commercially available terpene based polyester resin having an acid number of 130 and melting at about 150 degrees centigrade was dissolved in an ammoniacal solution. The resulting solution contained 16 percent resin solids and had a pH of 8.8.

Resin B

Shellac that has been refined, dried and bleached and which is described in commerce as bone bleached extra refined shellac (XSL). The shellac was dissolved in an ammoniacal solution (16% solids).

Resin C

Bleached, pale shellac. This shellac was dissolved in an ammoniacal solution (16% solids).

TABLE III

| Resin solution: | Stabilizer, percent of resin | Gardner Color Number | |
|---|---|---|---|
| | | Original | Aged 30 days at 52° |
| A | | 8 | 9 |
| A | 3.0 | 8 | 11-12 |
| B | | 6 | 9-10 |
| B | 3.0 | 6 | 12 |
| C | | 6 | 11-12 |
| C | 3.0 | 6 | 16 |

Although certain preferred embodiments of the invention have been disclosed for the purpose of illustration it will be evident that various changes and modifications may be made therein without departing from the scope and spirit of this invention.

What is claimed is:

1. A discoloration resistant alkali soluble resin comprising a thermoplastic esterified hydroxyalkylated phenol-aldehyde novolac resin containing less than about 0.5 percent of the phenolic hydroxyls is unreacted, containing as a discoloration inhibitor between about 0.5 percent and about 4.5 percent by weight of a sulfur containing compound selected from the group consisting of a compound of the formula RSH wherein R is selected from the group consisting of alkyl, aryl and alkylaryl and an alkali metal salt wherein the anion is selected from the group consisting of sulfite, bisulfite and hydrosulfite.

2. The resin according to claim 1 wherein the color inhibitor is sodium sulfite.

3. The resin according to claim 1 wherein the color inhibitor is sodium bisulfite.

4. The resin according to claim 1 wherein the color inhibitor is sodium hydrosulfite.

5. A discoloration resistant ammonia soluble thermoplastic esterified hydroxyalkylated phenol-aldehyde novolac resin in which less than about 0.5 percent of the phenolic hydroxyls are unreacted and containing as a discoloration inhibitor between about 0.5 percent and about 4.5 percent by weight of a sulfur containing alkali metal salt wherein the anion is selected from the group consisting of sulfite, bisulfite and hydrosulfite.

6. The resin according to claim 5 wherein the inhibitor is sodium sulfite.

7. The resin according to claim 5 wherein the inhibitor is sodium hydrosulfite.

8. A coating solution comprised of water, alkali soluble thermoplastic esterified hydroxylalkylated phenol-aldehyde novolac resin containing less than about 0.5 percent of the phenolic hydroxyls unreacted, a solubilizing amount of alkali and a discoloration inhibitor selected from the group consisting of a compound of the formula RSH wherein R is selected from the group consisting of alkyl, aryl and alkylaryl, and an alkali metal salt wherein the anion is selected from the group consisting of sulfite, bisulfite and hydrosulfite said discoloration inhibitor being present in an amount between about 0.5 percent and about 4.5 percent by weight of said alkali soluble resin.

References Cited

UNITED STATES PATENTS

| | | | |
|---|---|---|---|
| 2,542,008 | 2/1951 | Degroote et al. | 252—352 |
| 3,053,778 | 9/1962 | Toone | 260—2.5 |
| 3,280,005 | 10/1966 | Davis | 260—19 |
| 3,321,551 | 5/1967 | Knutson | 260—840 |
| 3,325,447 | 6/1967 | Kasparik | 260—45.9 |
| 3,373,127 | 3/1968 | Bean et al. | 260—23 |

OTHER REFERENCES

Megson, "Phenolic Resin Chemistry," p. 283, 1958. (Copy in group 140 TP 978.M45).

DONALD E. CZAJA, Primary Examiner

W. E. PARKER, Assistant Examiner

U.S. Cl. X.R.

260—28.5, 30.8, 31.8, 45.7, 52, 58, 97, 98